United States Patent
Choi et al.

(10) Patent No.: US 12,555,771 B2
(45) Date of Patent: Feb. 17, 2026

(54) CATHODE COATED WITH CATALYSTS AND HYBRID ELECTROLYTES FOR HIGH-ENERGY DENSITY LITHIUM-SULFUR (Li—S) BATTERIES

(71) Applicant: University of North Texas, Denton, TX (US)

(72) Inventors: Wonbong Choi, Coppell, TX (US); Sanket Bhoyate, Denton, TX (US)

(73) Assignee: University of North Texas, Denton, TX (US)

( * ) Notice: Subject to any disclaimer, the term of this patent is extended or adjusted under 35 U.S.C. 154(b) by 938 days.

(21) Appl. No.: 17/713,973

(22) Filed: Apr. 5, 2022

(65) Prior Publication Data
US 2022/0320487 A1    Oct. 6, 2022

Related U.S. Application Data

(60) Provisional application No. 63/170,862, filed on Apr. 5, 2021.

(51) Int. Cl.
*H01M 4/139* (2010.01)
*H01M 4/02* (2006.01)
(Continued)

(52) U.S. Cl.
CPC ......... *H01M 4/139* (2013.01); *H01M 4/0426* (2013.01); *H01M 4/362* (2013.01);
(Continued)

(58) Field of Classification Search
CPC ............................. H01M 4/139; H01M 4/362
See application file for complete search history.

(56) References Cited

U.S. PATENT DOCUMENTS

| 4,822,590 A | 4/1989 | Morrison et al. |
| 4,996,108 A | 2/1991 | Divigalpitiya et al. |

(Continued)

FOREIGN PATENT DOCUMENTS

WO    WO-2020040695 A1 *    2/2020    .......... H01M 4/0416

OTHER PUBLICATIONS

Chung SH, Lai KY, Manthiram A. "A Facile, Low-Cost Hot-Pressing Process for Fabricating Lithium-Sulfur Cells with Stable Dynamic and Static Electrochemistry", Adv Mater. Nov. 2018 (Year: 2018).*

(Continued)

*Primary Examiner* — Maria Laios
*Assistant Examiner* — Benjamin T Lustgraaf
(74) *Attorney, Agent, or Firm* — Norton Rose Fulbright US LLP

(57) ABSTRACT

Hybrid electrolyte-catalyst structures including a catalyst material, a solid state electrolyte (SSE) material, and a liquid electrolyte material deposited to form coating layer(s) on carbon materials (e.g., carbon nanotubes) prevent polysulfide shuttling, improve ion flow, and enhance utilization of active materials in lithium-sulfur batteries. For example, a solution including the catalyst material and the solid state electrolyte material may be drop casted on a carbon material or the catalyst material and the solid state electrolyte material may be deposited on the carbon material using a co-sputtering process. The liquid electrolyte material may be deposited on the solid state electrolyte-catalyst coated carbon material to form the hybrid electrolyte-catalyst coating layer(s). Coating a carbon substrate with the hybrid electrolyte-catalysts coating layer(s) can suppress polysulfide shuttling by catalyzing polysulfide reactions. Additionally, the coating layer(s) exhibit synergistic effects of accelerated and (Continued)

uniformly distributed ion flow for use as a carbon nanotube (CNT)-S cathode.

15 Claims, 9 Drawing Sheets

(51) Int. Cl.
    *H01M 4/04*       (2006.01)
    *H01M 4/36*       (2006.01)
    *H01M 4/62*       (2006.01)
    *H01M 4/66*       (2006.01)
    *H01M 10/052*     (2010.01)
    *H01M 10/0562*   (2010.01)

(52) U.S. Cl.
    CPC ............. *H01M 4/62* (2013.01); *H01M 4/663* (2013.01); *H01M 10/052* (2013.01); *H01M 10/0562* (2013.01); *H01M 2004/028* (2013.01); *H01M 2300/0074* (2013.01)

(56) References Cited

U.S. PATENT DOCUMENTS

| | | | |
|---|---|---|---|
| 9,914,647 | B2 | 3/2018 | Thevasahayam |
| 2009/0020734 | A1* | 1/2009 | Jang ....................... H01B 1/122 |
| | | | 252/519.34 |
| 2010/0104947 | A1* | 4/2010 | Choi ................. H01M 10/0565 |
| | | | 429/188 |
| 2014/0287305 | A1* | 9/2014 | Wachsman ........ H01M 10/0562 |
| | | | 429/211 |
| 2016/0093491 | A1 | 3/2016 | Choi et al. |
| 2017/0040604 | A1* | 2/2017 | Bakenov ............... H01M 4/623 |
| 2017/0062869 | A1 | 3/2017 | Zhamu et al. |
| 2020/0136177 | A1* | 4/2020 | Lee ......................... H01M 4/13 |

OTHER PUBLICATIONS

M. Hagen, S. Dorfler, P. Fanz, T. Berger, R. Speck, J. Tubke, H. Althues, M.J. Hoffmann, C. Scherr, S. Kaskel, "Development and costs calculation of lithium-sulfur cells with high sulfur load and binder free electrodes", Journal of Power Sources, vol. 224, 2013, pp. 260-268 (Year: 2013).*

Wang, M. et al. "Steam-Etched Spherical Carbon/Sulfur Composite with High Sulfur Capacity and Long Cycle Life for Li/S Battery Application," ACS Applied Materials & Interfaces, vol. 7, Issue 6, pp. 3590-3599, Feb. 2015, 10 pages.

Choi, W. et al. "Recent development of two-dimensional transition metal dichalcogenides and their applications," Materials Today, vol. 20, Issue 3, Apr. 2017, pp. 116-130, 15 pages.

Li, H. et al. "Emerging energy applications of two-dimensional layered transition metal dichalcogenides," Nano Energy, vol. 18, Nov. 2015, pp. 293-305, 13 pages.

Bhoyate, S. et al. "Mixed Phase 2D $Mo_{0.5}W_{0.5}S_2$ Alloy as a Multi-Functional Electrocatalyst for a High-Performance Cathode in Li—S Batteries," Journal of Materials Chemistry A, vol. 8, Issue 25, pp. 12436-12445, Jul. 2020, 10 pages.

Li, Z. et al. "Rational Designs and Engineering of Hollow Micro-/Nanostructures as Sulfur Hosts for Advanced Lithium-Sulfur Batteries," Energy & Environmental Science, vol. 9, Issue 10, 2016, pp. 3061-3070, 10 pages.

Hagen, M. et al. "Lithium-Sulfur Cells: The Gap between the State-of-the-Art and the Requirements for High Energy Battery Cells," Advanced Energy Materials, vol. 5, Issue 16, pp. 1401986, 2015, 11 pages.

Cha, E. "Nanoengineering to Achieve High Efficiency Practical Lithium-Sulfur Batteries," Nanoscale Horizons, vol. 5, Issue 5, pp. 808-831, 2020, 24 pages.

Yang, X. et al. "Towards High-Performance Solid-State Li—S Batteries: From Fundamental Understanding to Engineering Design," Chemical Society Reviews, vol. 49, Issue 7, pp. 2140-2195, 2020, 56 pages.

United States Patent and Trademark Office, Provisional Patent Application No. 63/005,177 to Choi, filed Apr. 3, 2020, entitled "2D TMD Alloys as Catalysts for Cathode in Li—S Batteries," 51 pages.

Bhoyate, S. et al. "Nanostructured Materials for Supercapacitor Applications," SPR Nanoscience, vol. 5, pp. 1-29, 2019, 29 pages.

Bhoyate, S. et al. "Broadening the Horizon for Supercapacitor Research via 2D Material Systems," Nanoscience, vol. 6, pp. 120-149, 2020, 30 pages.

* cited by examiner

CATHODE COATED WITH CATALYSTS AND HYBRID ELECTROLYTES FOR HIGH-ENERGY DENSITY LITHIUM-SULFUR (Li—S) BATTERIES

CROSS-REFERENCE TO RELATED APPLICATIONS

The present application claims the benefit of priority from U.S. Provisional Application No. 63/170,862 filed Apr. 5, 2021 and entitled "CATHODE COATED WITH CATALYSTS AND HYBRID ELECTROLYTES FOR HIGH-ENERGY DENSITY LITHIUM-SULFUR (Li—S) BATTERIES," the disclosure of which is incorporated by reference herein in its entirety.

TECHNICAL FIELD

The present disclosure generally relates to electrochemical energy storage systems and methods for manufacturing the same. Specifically, the present application provides for manufacturing and using electrodes having coatings that include electro-catalysts and hybrid electrolytes including solid state electrolytes and liquid electrolytes, in electrochemical energy storage systems, such as rechargeable metal ion batteries (e.g., lithium ion batteries).

BACKGROUND

There is a growing awareness that current lithium-ion battery technologies are reaching their limits in terms of storage and energy capabilities. However, there is still increasing demand for higher energy storage and longer lasting devices. For example, prevalent battery-based appliances (e.g., electric vehicles, mobile computing and telecommunications devices, aerospace transportation, specialized unmanned vehicles, etc.) require higher energy storage over conventional lithium-ion battery systems. This has challenged the research community to search for next-generation battery systems.

Lithium (Li) metal has been known as the "hostless" material to store Li ions (Li+) without the need for using intercalating and/or conducting scaffold techniques. For this reason, Li metal electrodes exhibit high theoretical specific capacity (e.g., approximately 3860 mAh g') and low redox potential (e.g., approximately 3.04 V); thus, they are often regarded as the best choice to use for manufacturing/fabricating anodes for next-generation rechargeable Li batteries. However, Li metal anodes exhibit properties that cause multiple practical issues which inhibit their use. These properties are often associated with uncontrollable dendrite formation during repeated Li deposition/dissolution processes, which can lead to short circuiting the battery and potential overheating and fire.

Among various electrochemical energy storage systems, lithium-sulfur (Li—S) batteries have potential to be a next generation rechargeable battery because of their high theoretical energy density (approximately 2600 Wh/kg$^{-1}$, which is five times higher than the approximately 387 Wh/kg$^{-1}$ energy density of the conventional Li-ion batteries), low cost, and the natural abundance of sulfur and other chalcogens (e.g., selenium, tellurium, etc.). An Li—S battery may include an anode, cathode, separator, electrolyte, negative terminal, positive terminal, and casing. The anode may include a Li electrode coated with at least one layer of catalyst material, and the cathode may include sulfur powder as a sulfur electrode and/or a composite with carbon structure (e.g., carbon nanotubes, graphene, porous carbons, free-standing 3D CNTs, etc.). The separator may include polypropylene (PP), polyethylene (PE), or the like, and the electrolyte may include any number of electrolyte solutions (e.g., aqueous, non-aqueous, etc.) which may allow for transporting Li ions between the cathode and the anode.

Despite the potential advantages of Li—S batteries, the high achievable energy density of Li—S batteries is currently limited due to an excess of electrolyte and low areal sulfur loading. For mass commercialization, the gravimetric energy density of packaged Li—S batteries should be higher than that of Li-ion cells, which have an energy density of at least 250 Wh/kg$^{-1}$. However, this is not the case. In conventional Li—S batteries, liquid electrolytes affect the practical energy density. By convention, 1 mol (M) of lithium bis(trifluoromethanesulfonyl)imide (LiTFSI) per liter of solution, with the solution including 50% per volume of dimethoxyethane and 50% per volume of dioxolane electrolyte, is typically used as a high Li ion conductive liquid electrolyte. At a higher electrolyte to sulfur (E/S) ratio of 10, the electrolyte weight in Li—S batteries with sulfur loading of 6 milligrams (mg) is 70.8 mg, which is higher than weight of the active cathode or anode, and results in an undesirably low energy density. Reducing liquid electrolyte in a high sulfur loaded Li—S battery affects the Li-ion diffusion between anode and bulk cathode, which affects the sulfur utilization during cycling. Thus, reducing the E/S ratio below 4 µL/mg can reduce the overall weight of a Li—S battery and may increase the resulting energy density in a the Li—S battery; however, reducing the E/S ratio below 4 µL/mg can reduce the sulfur utilization of a the Li—S battery, which can cause issues due to the effect on reaction kinetics. In addition to reduced sulfur utilization, bulk sulfur loading can also affect reaction kinetics and reduce the practical discharge voltage below 2.1 V, adversely affecting the practical energy density of the Li—S battery.

Additional issues complicate the use of liquid electrolytes, such as the issue of dissolution of higher-order lithium polysulfides (LiPS) such as $Li_2S_8$ and $Li_2S_6$ that may result in a shuttling effect during cell cycling, thus limiting the long term stability of Li—S batteries. This issue has been addressed by using polar catalysts (such as two-dimensional (2D) transition metal dichalcogenide (TMD) materials) acting as the polysulfide anchor in cathodes. Another approach to overcome this issue and to reduce the weight of Li—S batteries is to replace the liquid electrolytes in the Li—S batteries with solid electrolytes. Even though solid electrolytes represent a promising alternative to liquid electrolytes, several drawbacks to solid electrolytes exist, such as low ion conductivity, electrolyte porosity, and interface mismatch between electrolyte and anode/cathode during volume change. These drawbacks significantly limit the practical application of solid electrolytes in Li—S batteries. In addition to these drawbacks, solid electrolytes such as argyrodite in Li—S battery present low discharge voltages of 1.9 V, limiting the specific energy density of the Li—S batteries.

SUMMARY

Aspects of the present disclosure provide systems, devices, and methods of manufacturing and using a cathode having a coating that includes catalysts (e.g., two-dimensional (2D) transition metal dichalcogenide (TMD) materials such as $MoS_2$, $MoSe_2$, $MoWeTe_2$, BN—C, MoB etc.) and hybrid electrolytes including solid state electrolyte (SSE) materials (e.g., inorganic solid electrolytes such as argyrodite, garnet, lithium nitride, etc., solid polymer electrolytes such as polycarbonates, polynitrides, etc., or composite polymer electrolytes such as $Al_2O_3$, $TiO_2$, etc.), and liquid electrolytes (e.g., liquid salts in an organic solvent). These coatings, referred to herein as hybrid electrolyte-catalyst coatings, may then be coated with sulfur (e.g., by hot pressing, drop casting a polysulfide solution such as $Li_2S$, $Li_2S_4$, $Li_2S_6$, $Li_2S_8$, or the like to obtain active sulfur, or other similar methods) for use as cathodes in lithium-sulfur (Li—S) batteries. As such, aspects described herein support a new concept of a hybrid cathode structure that can serve as an efficient alternate to conventional cathodes to obtain high energy density in a Li—S battery with a low electrolyte to sulfur (E/S) ratio. As described herein, solid state electrolytes can uniformly coat a cathode interface via deposition using a dry process or a wet process to improve Li ion diffusion in bulk cathodes. Additionally, a liquid electrolyte may act as a high ion-conductive interface contact between an anode and the cathode. Cathodes coated with the hybrid electrolyte-catalyst coating may result in a reduced E/S ratio in addition to maintaining a sulfur utilization that is greater than 80%. Additionally, introducing a catalyst accelerates polysulfide transformation during charging or discharging of Li—S batteries, thereby mitigating (or resolving) the polysulfide shuttling issues in conventional high energy density Li—S batteries. Thus, Li—S batteries described herein exhibit improved ion diffusion in high sulfur loaded cathodes, resolve lithium polysulfide dissolution, and achieve high energy densities as compared to conventional Li—S batteries.

To fabricate the cathodes described herein, one or more catalyst materials and one or more SSE materials may be deposited (individually or as a mixture) on a carbon substrate (e.g., carbon nanotube (CNT) paper or the like). For example, the catalyst materials and the SSE materials may be individually deposited (in any order) on the carbon substrate or may be mixed together to form a mixture that is deposited on the carbon substrate. In some implementations, the deposition of the catalyst material(s) and SSE material(s) is performed using a wet process (e.g., drop casting). Alternatively, the deposition of the catalyst material(s) and the SSE material(s) may be performed using a dry process (e.g., sputtering). One or more liquid electrolyte materials may be deposited on the catalyst-and-SSE-coated substrate to form one or more hybrid electrolyte-catalyst coating layers that include a combination of the catalyst material(s), the SSE material(s), and the liquid electrolyte material(s). The liquid electrolyte material(s) may be deposited such that they fill in space(s) within the hybrid electrolyte-catalyst coating layer(s). In some implementations, sulfur may be added, such as by hot pressing sulfur, drop casting sulfur solution, or other chemical techniques, over the coating layers or intermediate coating layers. A cathode formed in this manner may be used in a Li—S battery.

Using a material, such as carbon, that is coated in a combination of catalyst(s), solid state electrolyte(s), and liquid electrolyte(s) as a cathode improves catalyzing polysulfide reactions and reduces polysulfide dissolution in electrolytes, as compared to cathodes in other Li—S batteries. Additionally, the hybrid electrolyte-catalyst coating according to the present disclosure provides a way to reduce the liquid electrolyte to sulfur ratio and enhance the utilization of active material (e.g., sulfur, carbon, etc.) of the cathode. Further, using such a coated cathode improves flow of Li ions in the Li—S battery, enables uniform distribution of electrodes, and improves stability of the Li—S battery by preventing electrolyte consumption caused by the interfacial reaction between electrolytes and the active materials, as exhibited in conventional Li—S batteries.

In a particular aspect, a method includes providing a carbon material. The method also includes depositing a catalyst material and a solid state electrolyte material on the carbon material to form a hybrid electrolyte-catalyst coated carbon material. In some implementations, the method includes depositing a mixture of the solid state electrolyte material and the catalyst material on the carbon material to form the hybrid electrolyte-catalyst coated carbon material. In some other implementations, the method includes individually depositing the solid state electrolyte material and the catalyst material on the carbon material to form the hybrid electrolyte-catalyst coated carbon material. In some other implementations, the method includes depositing the catalyst material on solid state electrolyte that is coated on the carbon material to form the hybrid electrolyte-catalyst coated carbon material. The method further includes depositing a liquid electrolyte material on the hybrid electrolyte-catalyst coated carbon material, such that the catalyst material, the solid state electrolyte material, and the liquid electrolyte material form one or more coating layers on the carbon material.

In another particular aspect, a Li—S battery cathode includes a substrate including a carbon material. The Li—S battery cathode further includes at least one hybrid electrolyte-catalyst coating layer disposed on the substrate. The at least one hybrid electrolyte-catalyst coating layer includes a catalyst material, a solid state electrolyte material, and a liquid electrolyte material.

In another particular aspect, a Li—S battery includes an anode and a cathode. The cathode includes a substrate including a carbon material. The cathode also includes at least one hybrid electrolyte-catalyst coating layer disposed on the substrate, the at least one hybrid electrolyte-catalyst coating layer including a catalyst material, a solid state electrolyte material, and a liquid electrolyte material. The Li—S battery further includes a separator disposed between the anode and the cathode.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the implementations in detail. It should be understood, however, that the detailed description and the specific examples, while indicating various aspects, are given by way of illustration only, and not by way of limitation. Various substitutions, modifications, additions, and/or rearrangements will become apparent to those skilled in the art from this disclosure.

Figure 1A:
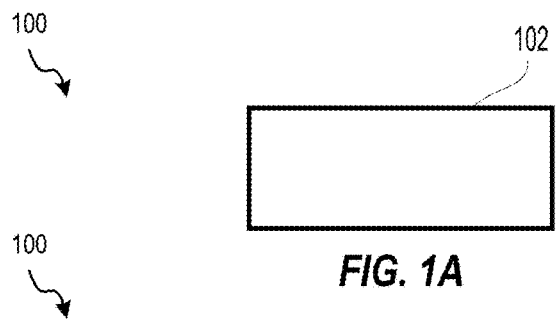
FIGS. 1A-E illustrate cross-sectional views of an example of a method for fabricating a cathode having a coating that includes catalyst material, solid state electrolyte (SSE) material, and liquid electrolyte according to one or more aspects.

According to certain aspects, catalyst material and solid state electrolyte (SSE) material may be deposited on a carbon material, and liquid electrolyte may be deposited on the coated carbon material, to form a hybrid electrolyte-catalyst coated carbon substrate. The catalyst material may include a two-dimensional (2D) transition metal dichalcogenide (TMD) material. As illustrated by FIGS. 1A-E, cross-sectional views of an example method for fabricating a cathode having a coating that includes catalyst material, SSE, and liquid electrolyte are illustrated in accordance with one or more aspects of the present application. Referring to FIG. 1A, prior to formation of a catalyst material thereon, substrate 102 may include conductive substrates such as, for example, carbon nanotube (CNT) paper, activated carbon, porous carbon structures in 1D, 2D or 3D structures, carbon powder, carbon fibers, graphite, graphene, graphene oxides, or other materials suitable for operations described herein. In some implementations, a ratio of a weight of the carbon material to an area of the carbon material may be between one milligram (mg) per square centimeter ($cm^2$) and ten $mg/cm^2$. In some implementations, substrate 102 may be cleaned, for example, with isopropanol using an ultrasonic bath, followed by cleaning with ethanol, methanol, and deionized water. It is noted that those skilled in the art should appreciate that there are other methods for cleaning substrate 102 that are suitable for operations discussed herein.

Figure 1B:
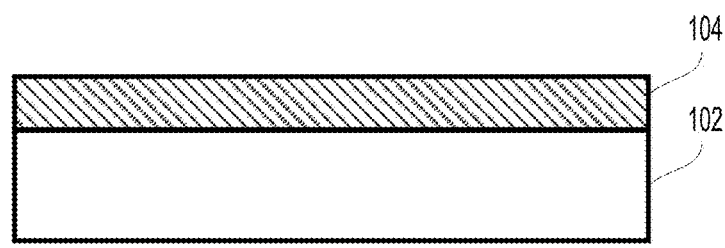

Referring to FIG. 1B, a catalyst material 104 (e.g., an electro-catalyst material) may be deposited on substrate 102. According to aspects of the disclosure, catalyst material 104 may be formed by a wet process or a dry process, each of which is described in more detail below, and the catalyst material 104 may include or correspond to a two-dimensional (2D) transition metal dichalcogenide (TMD) material. As used herein, 2D TMD materials refer to very thin layer(s) of TMD materials, typically less than 10 nm, preferably 1 nm or less, that have a same crystalline structure as thicker versions of the TMD materials (e.g., bulk forms). To illustrate, 2D TMD materials (e.g., one, or a few, very thin layers of TMD material) produce unusual properties as compared to the TMD materials in their bulk form, such as increased flexibility, larger bandgap, higher optical responsivity, and increased mobility, as non-limiting examples. To further illustrate, the differences in properties between 2D TMD materials and bulk form TMD materials may be similar to the difference in properties between graphite and graphene, even though both graphite and graphene have the same crystalline structure. The 2D TMD material may form a single layer or multiple layers (e.g., a few layers) of 2D TMD material(s) on substrate 102. In some implementations, the 2D TMD material may form a single atomic layer on the substrate 102, or each layer of the 2D TMD material may represent a respective atomic layer of material. In some implementations, the catalyst material 104 may include one or more of molybdenum disulfide ($MoS_2$), molybdenum diselenide ($MoSe_2$), molybdenum tungsten ditelluride ($MoWeTe_2$), boron carbon nitride (BN—C), molybdenum boride (MoB), or the like. It is appreciated that different metals may provide for catalyst materials with different performance. For example, an Mo—W alloy may be used because it is a stable alloy that can be made into stable Mo—W—$S_2$, Mo—W—$Se_2$, Mo—W—$Te_2$, or like alloys. Varying the composition of catalyst material 104 corresponds to a systematic tradeoff between lithium polysulfides (LiPS) binding interaction, Li-ion diffusion, and electron conductive pathways, which allows for higher LiPS conversion kinetics. For example, 1T phase (metallic) molybdenum disulfide ($MoS_2$) shows higher catalytic activity for polysulfide conversion as compared to 2H phase $MoS_2$ (semiconducting) owing to its higher binding energy with LiPSs. However, the energy barrier for Li-ion diffusion on a pristine 2H $MoS_2$ (e.g., 0.47 eV) is lower than that for Li-ion diffusion on 1T $MoS_2$ (e.g., 0.8 eV). Additionally, the electron conductivity of metallic 1T $MoS_2$ may be six orders of magnitude higher than 2H $MoS_2$.

Figure 1C:
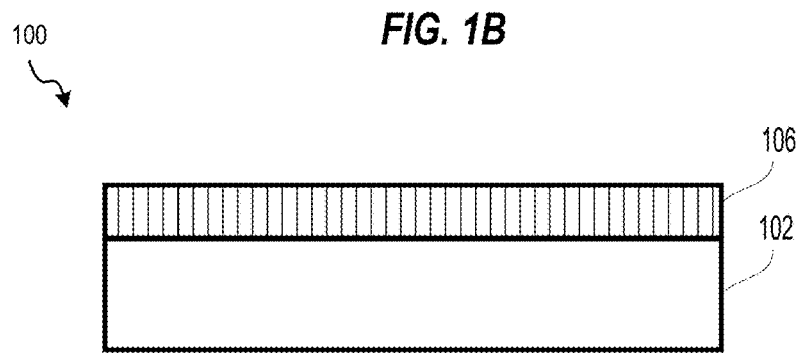

Turning to FIG. 1C, an SSE material may be deposited onto the substrate 102 including the catalyst material 104 to form a combination of the SSE material and catalyst material 104 on substrate 102, referred to herein as SSE-catalyst coating 106. According to aspects of the disclosure, the SSE material may be deposited by a wet process or a dry process, each of which are described in more detail below with reference to FIGS. 2A-D and 3A-D, respectively. Although shown in FIGS. 1B and 1C as individual deposition operations performed in a particular order (e.g., the catalyst material 104 being deposited before the SSE material), in some other implementations, the depositions may be performed in a different order (e.g., the SSE material may be deposited before the catalyst material 104) or as a single operation. To illustrate, a mixture of an SSE material and a catalyst material may be deposited onto the substrate 102 to form the SSE-catalyst coating 106. Alternatively, the SSE material may be deposited on the substrate 102 before depositing of the catalyst material 104).

Figure 1D:
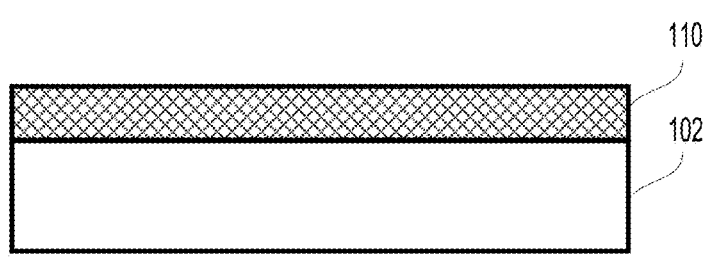

Turning to FIG. 1D, a liquid electrolyte may be deposited onto the substrate 102 including the SSE-catalyst coating 106 to form a combination of the liquid electrolyte, the SSE material, and the catalyst material 104, referred to herein as one or more coating layers 110 (e.g., one or more hybrid electrolyte-catalyst coating layers). The liquid electrolyte may fill space(s) between the catalyst material and the SSE material in the coating layers 110. In some implementations, the coating layers 110 can be parallel in coating or can include heterostructures (e.g., a semiconductor structure in which the chemical composition changes with position). In some implementations, the liquid electrolyte includes 1 mole (M) of lithium bis(trifluoromethanesulfonyl)imide (LiTFSI) per liter of solvent. In such implementations, the solvent may include 50% per volume of dimethoxyethane and 50% per volume of dioxolane electrolyte. The combination of the catalyst material, the SSE material, and the liquid electrolyte (e.g., the one or more coating layers 110) may be stacked to increase sulfur loading. In some implementations, prior to depositing the liquid electrolyte material, the substrate 102 coated with the SSE-catalyst coating 106 may be annealed at a temperature between 50 and 1000° C. for a duration that does not exceed 10 hours.

In aspects of the present disclosure, Li—S battery cathodes may be fabricated by hot-pressing sulfur powder (99.98%, Sigma Aldrich) onto the one or more coating layers 110 to obtain a binder-free catalytic sulfur cathode. The hot-pressing may occur between 100 and 200 degrees Celsius (° C.). In some implementations, Li—S battery cathodes may be fabricated by solution casting a sulfur binder solution (e.g., sulfur powder, polyvinyl difluoride, carbon powder, and n-methyl 2 pyrrolidone) or a polysulfide solution (e.g., $Li_2S_6$ or $Li_2S_8$ in solvent including 50% volume dimethoxyethane and 50% volume dioxolane electrolyte) onto the coating layers 110. In some implementations, Li—S battery cathodes may be fabricated by sulfurizing the coating layers 110. After sulfurizing, a weight percentage for sulfur to hybrid solid state electrolyte-catalyst coated carbon material may be between 1% and 99%. In some implementations, the liquid electrolyte may be deposited onto the substrate 102 coated with the SSE-catalyst coating 106 such that the electrolyte to sulfur ratio is between 1 and 20 microliters (μL) per milligram (mg).

Figure 1E:
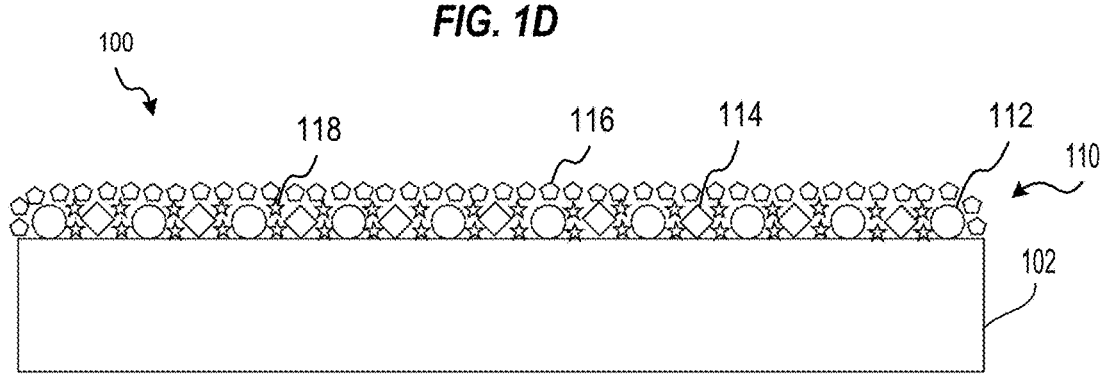

Turning to FIG. 1E, a magnified view of the coating layers 110 and the substrate 102 is shown. As shown in FIG. 1E, the coating layers 110 (e.g., the hybrid electrolyte-catalyst coating) include catalysts 112 (e.g., the catalyst material 104), solid state electrolytes 114, liquid electrolytes 116, and sulfur particles 118. The liquid electrolytes 116 (and/or the sulfur particles 118) may fill in spaces between the catalysts 112 and the solid state electrolytes 114.

According to aspects, using hybrid electrolyte-catalyst coated carbon materials (e.g., a carbon substrate coated with a combination of catalyst materials, SSE materials, and liquid electrolytes) as cathodes in Li—S batteries provides enhanced polysulfide conversion kinetics compared to other Li—S batteries. In turn, the fast conversion of soluble polysulfides enhances the cycle life and energy density of Li—S batteries that include the substrate 102 with the one or more coating layers 110 by decreasing accumulation of the soluble polysulfides in the cathode and their loss from the cathode by diffusion. Additionally, the one or more coating layers 110 may provide a way to reduce the liquid electrolyte to sulfur ratio and enhance the utilization of active material (e.g., sulfur, carbon, etc.) of the cathodes. Further, using a cathode that includes the one or more coating layers 110 improves flow of Li ions in the Li—S battery, enables uniform distribution of electrodes, and improves stability of the Li—S battery by preventing electrolyte consumption caused by the interfacial reaction between electrolytes and the active materials in other Li—S batteries.

Figure 2A:
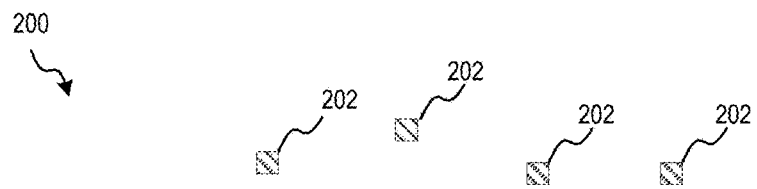
FIGS. 2A-D illustrate operations of an example method for fabricating, by a wet process, the cathode of FIGS. 1A-E according to one or more aspects.
Figure 2A:

FIGS. 2A-D illustrate operations of an example method for fabricating, by a wet process, the cathode of FIGS. 1A-E in accordance with one or more aspects of the present application. FIG. 2A shows an operation 200 for depositing a catalyst material on the substrate 102. The catalyst material may be deposited onto the substrate 102 using hydrothermal, solvothermal, or microwave assisted synthesis. As shown in FIG. 2A, a solution 202 including a catalyst material may be drop casted onto the substrate 102. The solution 202 may be formed by dissolving one or more catalyst materials or catalyst alloys in a solvent. For example, each of ammonium tetrathiomolybdate and ammonium tetrathiotungstate may be dissolved in a non-reactive organic solvent to form the solution 202. In some implementations, a solution including SSE material and catalyst material may be drop casted onto the substrate 102 such that the substrate 102 becomes coated with both catalyst material and SSE material (e.g., the SSE-catalyst coating 106).

Figure 2B:
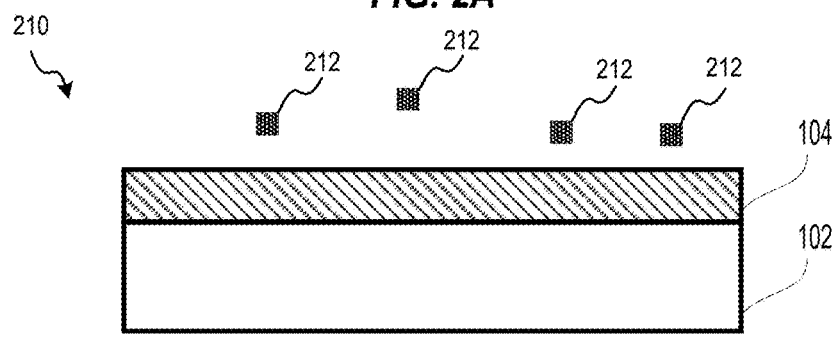

FIG. 2B shows an operation 210 for depositing an SSE material. As shown in FIG. 2B, a solution 212 including SSE material may be drop casted onto the substrate 102 and the catalyst material 104 such that the substrate 102 becomes coated with both catalyst material and SSE material (e.g., the SSE-catalyst coating 106). The solution 212 may be formed by dissolving one or more SSE materials in a solvent. For example, lithium halogenide, phosphorus pentasulfide, lithium sulfide, a catalyst precursor material, or a combination thereof may be dissolved in a non-reactive organic solvent to form the solution 212. The lithium halogenide may include lithium chloride, lithium bromide, lithium iodide, or the like. In some implementations, the ratio of lithium sulfide to lithium halogenide to phosphorus pentasulfide may be 5 to 2 to 1. The non-reactive organic solvent may include tetrahydrofuran or the like. The dissolution of the SSE material in the non-reactive organic solvent can occur over different temperature ranges and different time periods, such as within a temperature range from 25 to 100° C. for one or more hours, as a non-limiting example. The non-reactive organic solvent may be stirred continuously during the dissolution process. After completion of the dissolution process, the ratio of SSE material to solvent in the solution 212 may be between 0.05 and 100 mg per milliliter (mL). The ratio of the solution 212 to the area of substrate 102 may be between one μL per cm² and one mL per cm². The ratio of the solution 212 to the area of substrate 102 may impact a thickness of the SSE-catalyst coating 106. The thickness of the SSE-catalyst coating 106 may be between 0.5 and 10 mg/cm². After the solution 212 has been dropped onto the catalyst material 104 to form the SSE-catalyst coating 106, the SSE-catalyst coating 106 on the substrate 102 may be sintered. The sintering can may occur over different temperature ranges and for different time periods. For example, the sintering may occur within a temperature range from 25 to 1000° C. for one or more hours under vacuum.

Figure 2C:
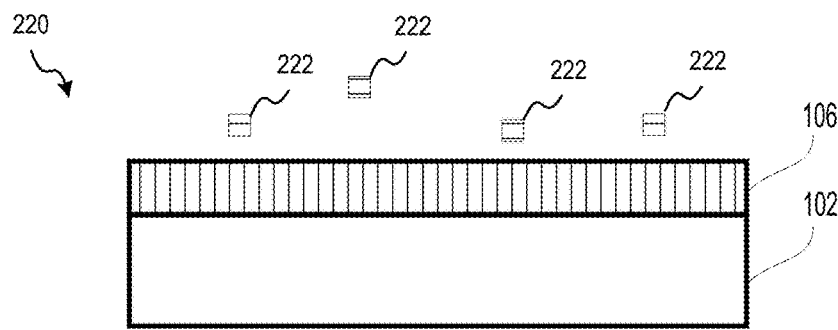
Figure 2D:
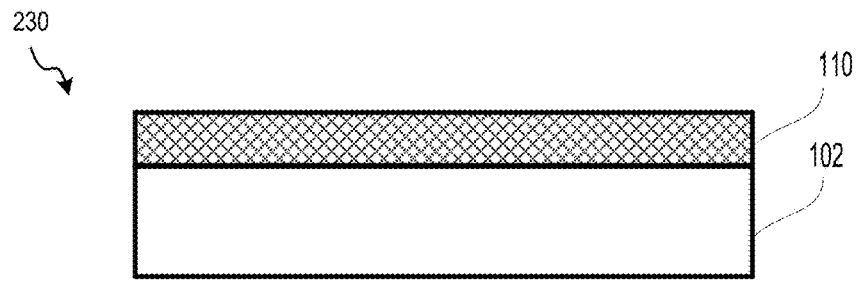

FIG. 2C shows an operation 220 for depositing a liquid electrolyte. As shown in FIG. 2C, a liquid electrolyte 222 may be deposited onto the SSE-catalyst coating 106 to form the one or more coating layers 110 on the substrate 102. The liquid electrolyte may fill space(s) between the catalyst material 104 and the SSE material within the one or more coating layers 110. In some implementations, the liquid electrolyte 222 may include 1M of LiTFSI per liter of solvent, with the solvent including 50% per volume of dimethoxyethane and 50% per volume of dioxolane electrolyte. Turning to FIG. 2D, an operation 230 includes providing the substrate 102 with the one or more coating layers 110 to be used as a cathode in a Li—S battery. In some implementations, sulfur pressing may occur, such as after the operation 220 shown in FIG. 2B, to add sulfur to the one or more coating layers 110.

Figure 3A:
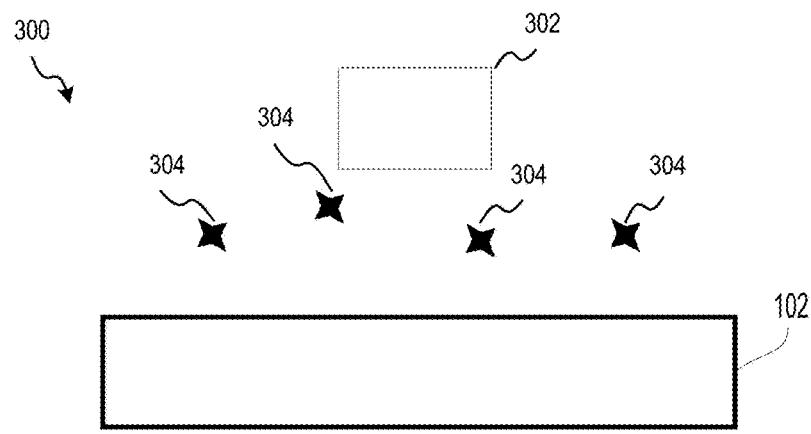
FIGS. 3A-D illustrate operations of an example method for fabricating, by a dry process, the cathode of FIGS. 1A-E according to one or more aspects.

FIGS. 3A-D illustrate operations of an example method for fabricating, by a dry process, the cathode of FIGS. 1A-E. FIG. 3A shows an operation 300 for depositing catalyst materials. As shown in FIG. 3A, one or more catalyst materials 304 may be sputtered from a first source 302 onto substrate 102 to coat a surface of the substrate 102 with the catalyst material 104. In some implementations, the concentration of catalyst material 304 to substrate 102 may be between 0.1 and 10 mg/cm$^2$ to accompany a sulfur loading of between 1 and 10 mg/cm$^2$. The one or more catalyst materials 304 may comprise materials such as silicon (Si), germanium (Ge), tin (Sn), lead (Pb), antimony (Sb), aluminum (Al), titanium (Ti), tantalum (Ta), molybdenum (Mo), niobium (Nb), tungsten (W), hafnium (Hf), nickel (Ni), cobalt (Co), cadmium (Cd), and/or other metals suitable for forming catalysts. Using magnetron radio frequency (RF) co-sputtering, one or more successive layers of the one or more catalyst materials 304 may be deposited onto substrate 102. In some implementations, inert gas such as, for example, pure (e.g., approximately 99.999% purity) argon, helium, or other gases with low reactivity with other substances may be fed into a chamber via a gas inlet valve (not depicted) during the sputtering. Sputtering the one or more catalyst materials 304 onto substrate 102 preferably occurs within the chamber at temperatures set between room temperature and 500° C. In some implementations, the chamber may be evacuated, before each sputtering run, to a vacuum level of, e.g., ≤2×10$^{-6}$ Torr without plasma. In operation according to some aspects, co-sputtering of transition metal ions may start when an RF power of 10-100 W is applied to the one or more catalyst materials 304 and one or more layers of transition metals alloys are consequently deposited on substrate 102. The sputtering duration may be varied from 1 second to 30 minutes to adjust the thickness of the catalyst material 104 deposited on substrate 102. In some implementations, prior to deposition on substrate 102, the one or more catalyst materials 304 may be pre-sputtered in the chamber for a pre-determined time to stabilize the deposition process.

The composition of the catalyst material 104 may comprise stoichiometric or non-stoichiometric sulfides, phosphides, selenides, and tellurides of Si, Ge, Sn, Pb, Sb, Al, Ti, Ta, Mo, W, Hf, Ni, Nb, Co, Cd, and composites thereof. For example, the one or more catalyst materials 304 may comprise molybdenum disulfide ($MoS_2$), tungsten disulfide ($WS_2$), molybdenum diselenide ($MoSe_2$), tungsten diselenide ($WSe_2$), molybdenum ditelluride ($MoTe_2$), niobium diselenide ($NbSe_2$), or other transition metal dichalcogenides. The composition of catalyst material 104 (e.g., $Mo_{1-x}W_x$, $Nb_{1-x}W_x$, $Mo_xNb_{(1-x)}$, etc.) is preferably controlled by varying the power (P) applied to the one or more catalyst materials 304. For example, the co-sputtering power ratio for Mo (e.g., corresponding to one of the one or more catalyst materials 304) and W (e.g., corresponding to a second of the one or more catalyst materials 304) metals, represented as P(W)/[(P(Mo)+P(W)], may be increased from 0-1 to fabricate resulting $Mo_{1-x}W_xS_2$ alloys with different compositions. Additionally or alternatively, the composition of catalyst material 104 may be tuned by varying the respective sputtering duration applied for each of the one or more catalyst material 304.

Figure 3B:
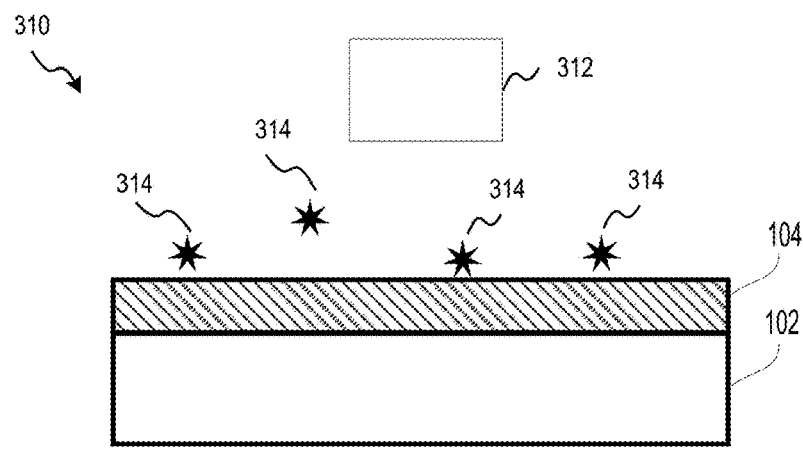

FIG. 3B shows an operation 310 for depositing SSE material. As shown in FIG. 3B, one or more SSE materials 314 may be sputtered from a second source 312 to the catalyst material 104 on the substrate 102 to form the SSE-catalyst coating 106 (e.g., a combination of SSE material(s) and catalyst material(s)) on the substrate 102. In some implementations, the concentration of the one or more SSE materials 314 to substrate 102 may be between 0.05 and 10 mg/cm$^2$ to accompany a sulfur loading of between 1 and 10 mg/cm$^2$. The one or more SSE materials 314 may be sputtered on the substrate 102 concurrently (e.g., at least partially overlapping with), before, or after sputtering of the one or more catalyst materials 304 on the substrate 102. The one or more SSE materials 314 may include inorganic solid electrolytes, solid polymer electrolytes, and/or composite polymer electrolytes. Such inorganic solid electrolytes may include materials such as argyrodite, garnet, lithium nitride, or the like. Such solid polymer electrolytes may include materials such as polycarbonates, polynitrides, or the like. Such composite polymer electrolytes may include materials such as aluminum oxide ($Al_2O_3$), titanium dioxide ($TiO_2$), or the like.

Figure 3C:
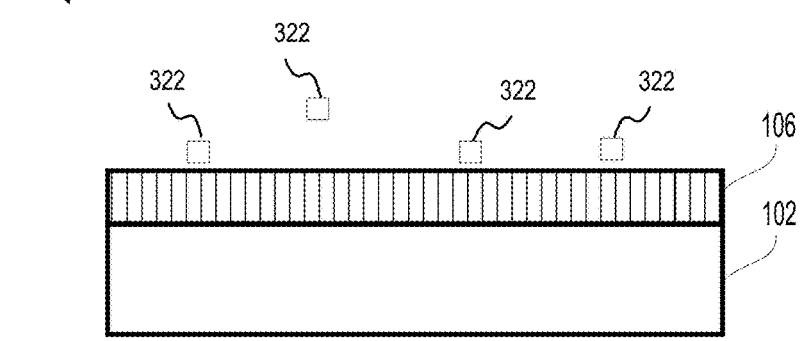
Figure 3D:
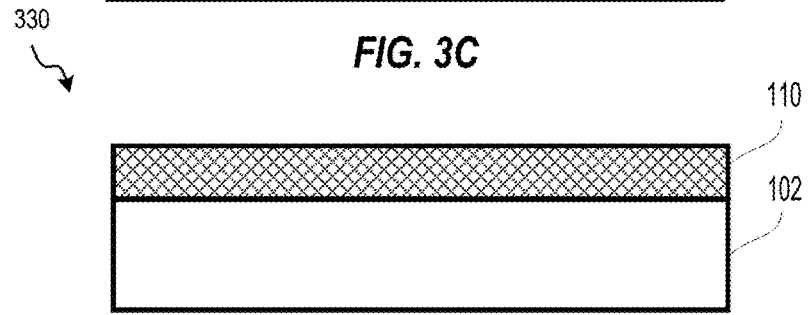

FIG. 3C shows an operation 320 for depositing a liquid electrolyte. As shown in FIG. 3C, a liquid electrolyte 322 may be deposited onto the SSE-catalyst coating 106 to form the one or more coating layers 110 on the substrate 102. The liquid electrolyte 322 may be deposited after the one or more catalyst materials 304 and the SSE materials 314 have been sputtered on the substrate 102. The liquid electrolyte 322 may fill space(s) between the catalyst material(s) and the SSE material(s) within the one or more coating layers 110. In some implementations, the liquid electrolyte 322 may include 1 M of LiTFSI per liter of solvent, with the solvent including 50% by volume of dimethoxyethane and 50% by volume of dioxolane electrolyte. The one or more coating layers 110 may be stacked to increase sulfur loading. FIG. 3D shows an operation 330 for providing the substrate 102 with the one or more coating layers 110 as a cathode to be used in a Li—S battery. In some implementations, sulfur pressing may occur, such as after the operation 320 shown in FIG. 3B, to add sulfur to the one or more coating layers 110.

Figure 4:
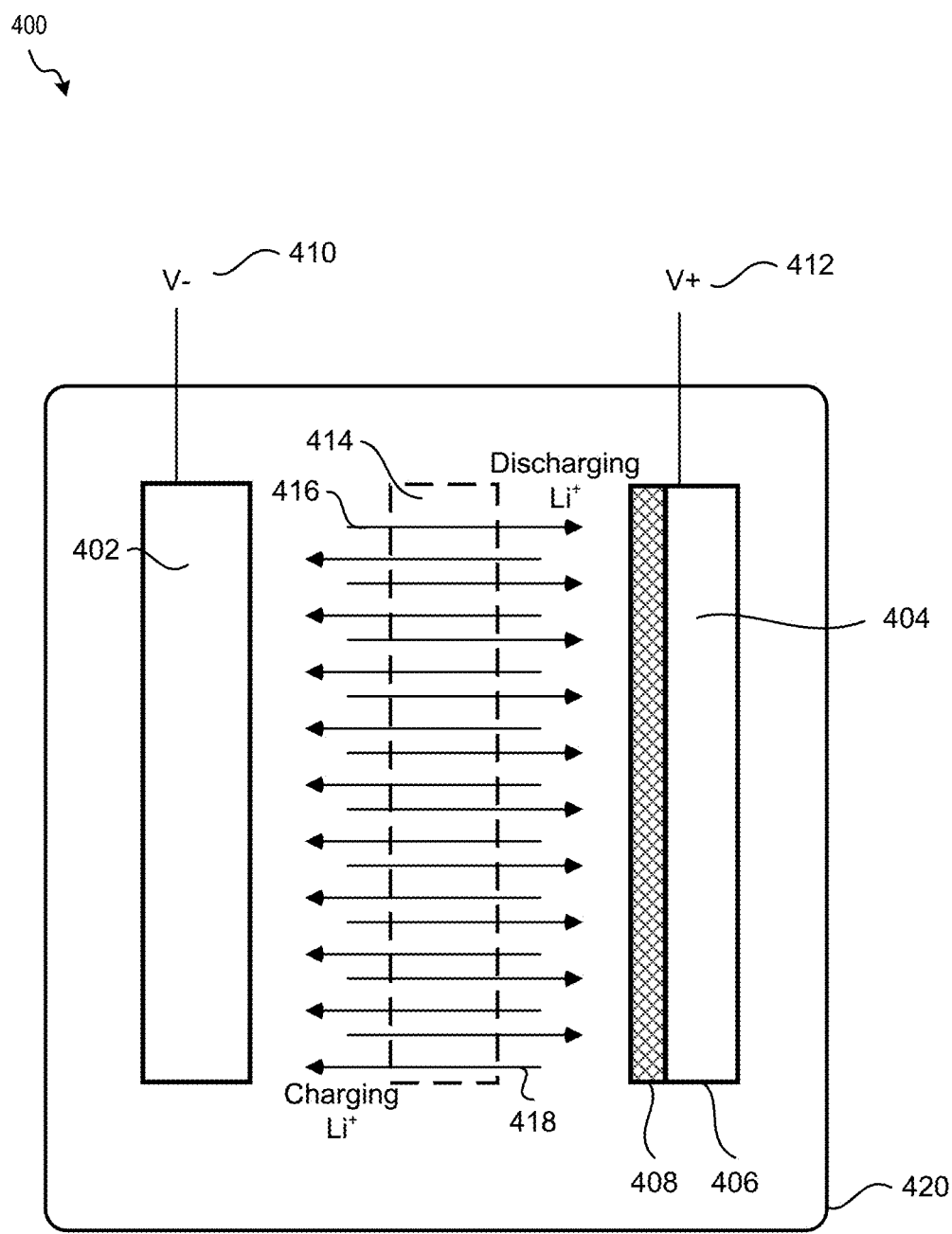
FIG. 4 illustrates a battery system implemented with a cathode including one or more coating layers that include catalyst material, SSE material, and liquid electrolyte in accordance with one or more aspects.

FIG. 4 illustrates an example Li—S battery (LSB) system 400 in accordance with one or more aspects of the present application. In some implementations, LSB system 400 may include anode 402, cathode 404, separator 414, current collectors 410 and 412, and casing 420. Anode 402 may be a conductive substrate and may include, for example, an electrode made of Li, Na, Mg, or other conductive materials suitable for operations described herein. Although not illustrated, anode 402 may be additionally coated with at least one layer of a catalyst material or a combination of a catalyst material, SSE material, and liquid electrolyte, as described with reference to cathode 404. Cathode 404 may include a substrate 406 (e.g., corresponding to substrate 102 of FIGS. 1A-E, 2A-D, and 3A-D) and one or more coating layers 408 that include a combination of catalyst material(s), SSE material(s), and liquid electrolyte(s) (e.g., corresponding to the one or more coating layers 110 of FIGS. 1D, 2D, and 3D). The one or more coating layers 408 may be formed in accordance with the method described further herein with reference to FIG. 5. Additionally, the one or more coating layers 408 may be coated with one or more sulfur layers that are formed, for example, by hot-pressing sulfur powder or drop casting polysulfide solution thereon (or on an intermediate coating layer(s)). The polysulfide solution can be composed of $Li_2S$ or $Li_2S_4$ or $Li_2S_6$ or $Li_2S_8$ powder dissolved in non-reactive solvent including a 1M LiTFSI salt. Alternatively, the one or more coating layers 408 may include sulfur within the one or more coating layers 408, with the sulfur being included in the coating layers using any of the above-described techniques.

In operation according to one or more aspects, ion flow 416 illustrates the flow of discharging ions (e.g., Li+, etc.) from anode 402, and ion flow 418 illustrates the flow of charging ions (e.g., Li+, etc.) from cathode 404. Separator 414 may be positioned between anode 402 and cathode 404 and may include, for example, polypropylene (PP), polyethylene (PE), other materials suitable for operations discussed herein, or combinations thereof. Separator 414 preferably has pores through which ion flows 416 and 418 may pass.

According to some implementations, current collector 410 may be attached to anode 402 and current collector 412 may be attached to cathode 404. In operation according to some implementations, current collectors 410 and 412 may extend, through casing 420, from an interior region of casing 420 to an exterior region of casing 420. Additionally, current collectors 410 and 412 may correspond to negative and positive voltage terminals, respectively, and comprise conductive materials. For example, current collector 410 may include copper metal and current collector 412 may include aluminum metal. Casing 420 may include a variety of cell form factors. For example, implementations of LSB system 400 may be incorporated in a cylindrical cell (e.g., 13650, 18650, 18500, 26650, 21700, etc.), a polymer cell, a button cell, a prismatic cell, a pouch cell, or other form factors suitable for operations discussed herein. Further, one or more cells may be combined into larger battery packs for use in a variety of applications (e.g., vehicles, laptops, etc.). In certain implementations, microcontrollers and/or other safety circuitry may be used along with voltage regulators to manage cell operation and may be tailored to specific uses of LSB system 400. In some implementations, as shown in FIG. 4, the casing 420 does not include an electrolyte surrounding the anode 402 and the cathode 404, due to the one or more coating layers 408 including SSE and liquid electrolytes. In other implementations, an additional electrolyte (e.g., a SSE, a liquid electrolyte, etc.) may be included within the casing 420.

Figure 5:
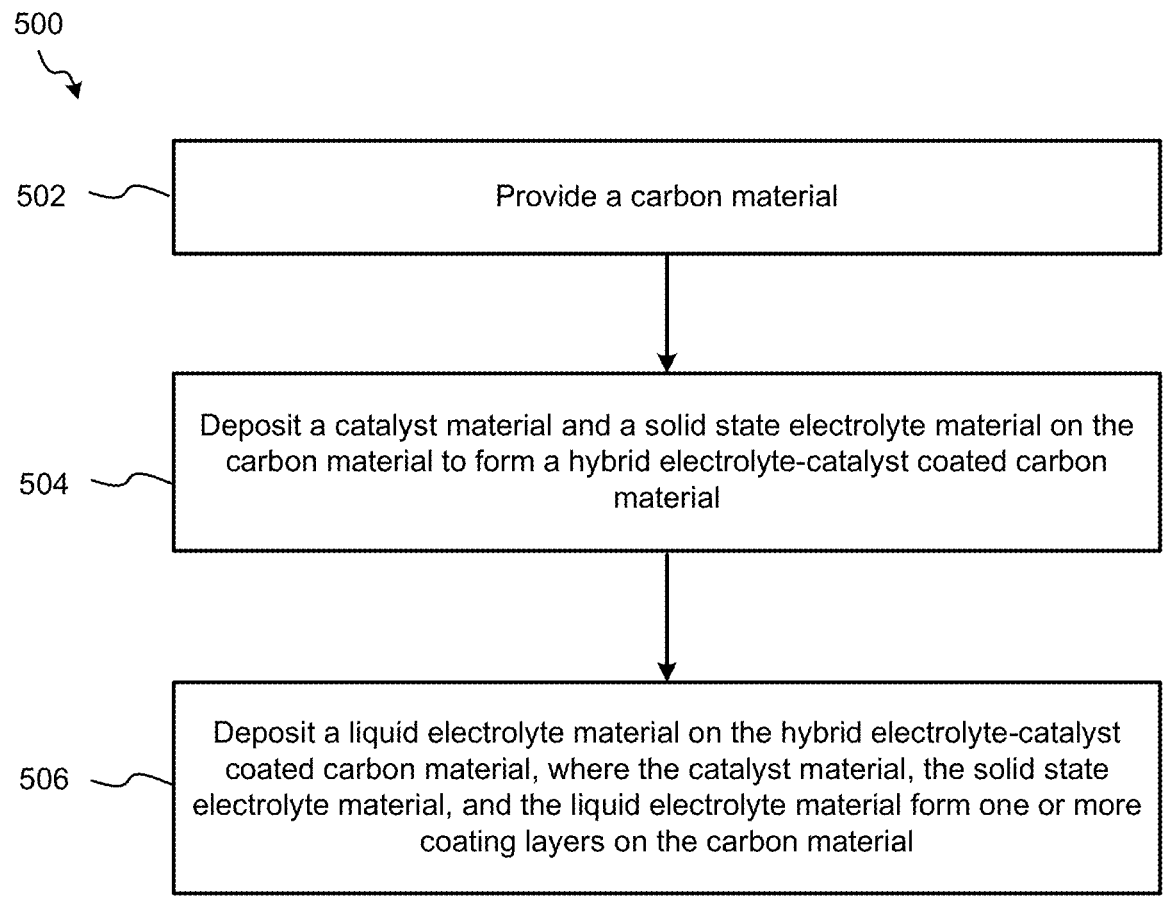
FIG. 5 is a flow diagram of an example of a method for fabricating a cathode having a coating that includes catalyst material, SSE material, and liquid electrolyte according to one or more aspects.

FIG. 5 illustrates an example of a method 500 for fabricating a cathode having a coating that includes catalyst material, SSE material, and liquid electrolyte in accordance with one or more aspects of the present application. In certain implementations, method 500 may correspond to the exemplary fabrication processes illustrated and described with reference to FIGS. 1A-E.

The method 500 includes providing a carbon material at 502. For example, the carbon material may include or correspond to the substrate 102 of FIGS. 1A-E. The method 500 includes depositing a catalyst material and a solid state electrolyte material on the carbon material to form a hybrid electrolyte-catalyst coated carbon material, at 504. For example, the catalyst material may include or correspond to the catalyst material 104 of FIG. 1B, and hybrid electrolyte-catalyst coated carbon material may include or correspond to the SSE-catalyst coating 106 of FIG. 1C.

The method 500 includes depositing a liquid electrolyte material on the hybrid electrolyte-catalyst coated carbon material, at 506. The catalyst material, the solid state electrolyte material, and the liquid electrolyte material form one or more coating layers on the carbon material. For example, the one or more coating layers may include or correspond to the coating layers 110 of FIG. 1D. In some implementations, the catalyst material and the solid state electrolyte material may be deposited using a wet technique, as further described with reference to FIGS. 2A-D. In some other implementations, the catalyst material and the solid state electrolyte material may be deposited using a dry technique, as further described with reference to FIGS. 3A-D. The catalyst material, the solid state electrolyte material, and the liquid electrolyte material form one or more coating layers on the carbon material. For example, the one or more coating layers may include or correspond to the one or more coating layers 110 of FIGS. 1D and 1E (e.g., a combination of the catalysts 112, the solid state electrolytes 114, and the liquid electrolytes 116 of FIG. 1E).

Figure 6:
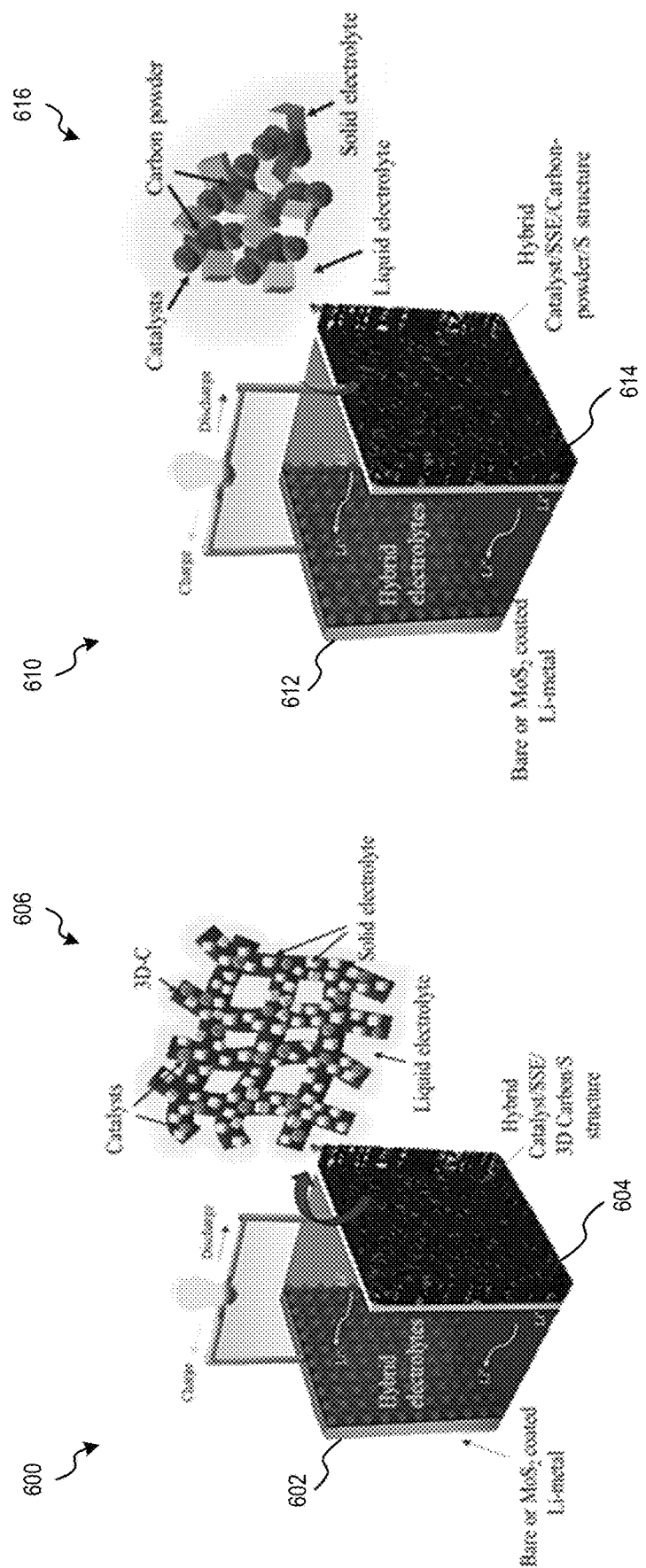
FIG. 6 illustrates schematics of a lithium-sulfur (Li—S) battery and a cathode having a coating including catalyst material, SSE material, and liquid electrolyte according to one or more aspects.

Experimental Testing of a Cathode Including a Coating of Catalysts, SSEs, and Liquid Electrolytes The following describes experimental implementations of a cathode including a coating (e.g., one or more layers) that include combinations of catalyst, SSEs, and liquid electrolytes. FIG. 6 shows schematics of the Li—S batteries formed in the experimental implementations and a structure of a hybrid cathode that includes catalysts (e.g., 2D TMD materials), SSEs, liquid electrolytes, 3D carbon, and sulfur. As shown in FIG. 6, a first Li—S battery 600 includes an anode 602 (e.g., bare or $MoS_2$ coated Li-metal) and a cathode 604 that includes a coating of catalyst, SSE, 3D carbon, and S, as shown in magnified view 606. A second Li—S battery 610 includes an anode 612 (e.g., bare or $MoS_2$ coated Li-metal) and a cathode 614 that includes a coating of catalyst, SSE, carbon powder, and S, as shown in magnified view 616. The interface of the current collector in Li—S batteries 600 and 610 creates a tri junction of catalyst for an improved polysulfide conversion, high ion conductivity of solid-liquid electrolyte necessitating a low E/S ratio and faster electron transfer from carbon substrate. The composite structure (e.g., the coating of cathodes 604 or 614) can be infiltrated with sulfur either by hot pressing or solution casting using a sulfur-binder solution (e.g., S powder+ polyvinyldifluoride+C powder+n-methyl-2-pyrrolidone) or a polysulfide solution (e.g., $Li_2S_6/Li_2S_8$ in DME/DOL vol. 50/50% solution). The binder-free hybrid cathodes 604 and 614 may include carbon powders including Catalyst/Hybrid Electrolytes/Carbon-powder/S structure loaded with small amount of liquid electrolyte. The carbon powders can be activated carbons, graphene, carbon black and fine graphite, or the like.

Figure 7:
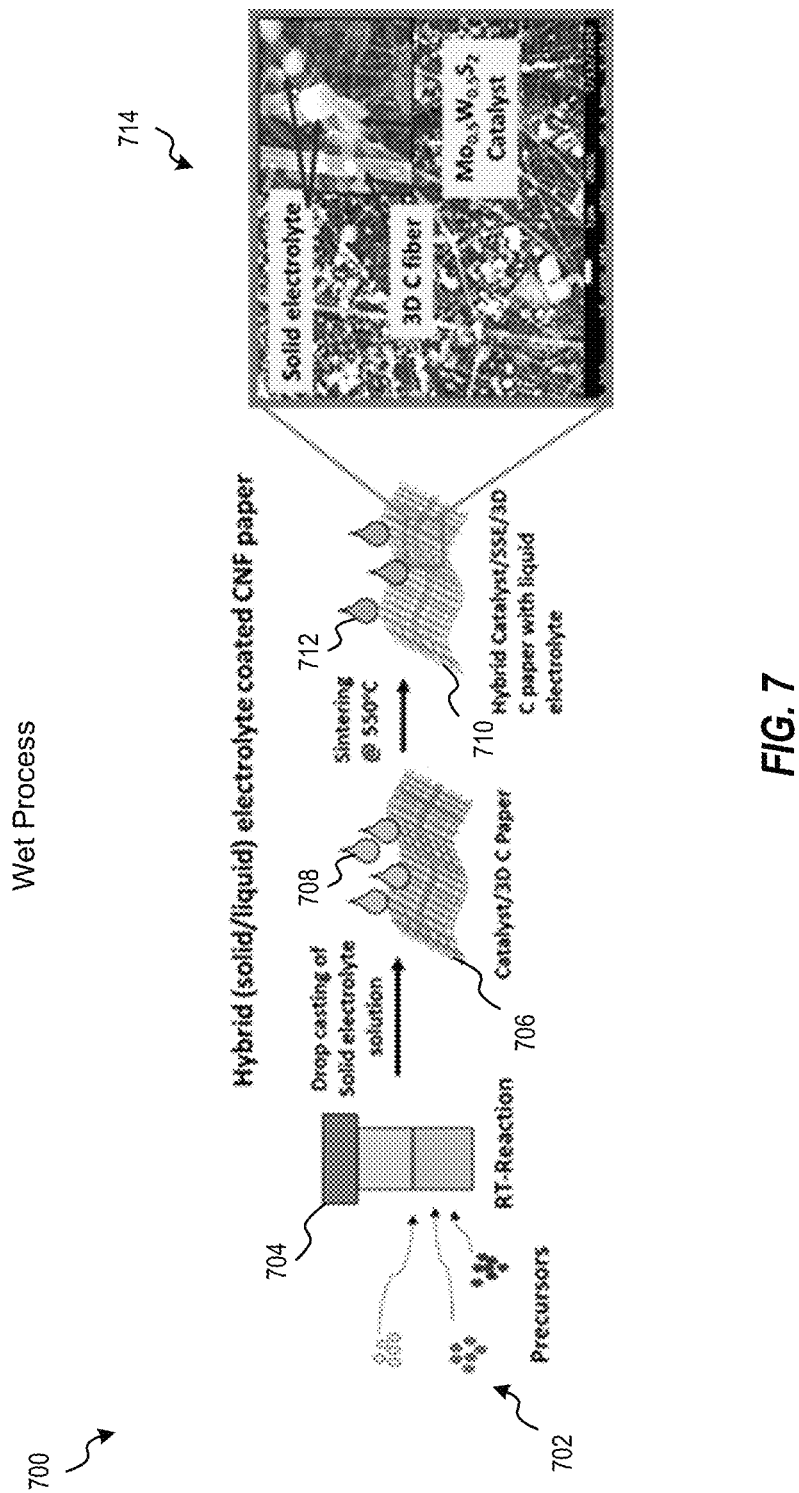
FIG. 7 illustrates a schematic for an example synthesis method (e.g., a wet process) to form the cathode of FIG. 6 according to one or more aspects.

A schematic 700 for a synthesis method to form the cathode including the coating is shown in FIG. 7. The example shown in FIG. 7 corresponds to a wet process for forming the cathode. First, a catalyst-coated 3D carbon nanofiber (CNF) structure was synthesized using a hydrothermal reaction. To perform the reaction, precursors 702 were mixed, such as 20 grams (g) of ammonium tetrathiomolybdate and 35 g of ammonium tetrathiotungstate were mixed homogenously in 40 mL of dimethyl formamide. The resulting solution was transferred to a 150 mL, Teflon lined, stainless-steel autoclave reactor 704. The 3D CNF paper was 3 cm×3 cm×0.01 cm and was dropped in the reactor. The reaction was carried out for 18 hours at 210° C. The resulting carbon material having a catalyst coating (catalyst/carbon material 706) was washed several times with ethanol and dried at 60° C. under vacuum. The resulting weight loading of catalyst was around 0.3-0.5 mg/cm$^2$.

A precursor solution of SSE was prepared by dissolving lithium chloride (LiCl), phosphorus pentasulfide ($P_2S_5$), and lithium sulfide ($Li_2S$) in a ratio of $Li_2S$:LiCl:$P_2S_5$=5:2:1 in 10 mL tetrahydrofuran (THF) to obtain a solution concentration of approximately 1 g/mL. The solution was then transferred to a 20 mL glass vial and allowed to react for 24 hours at 60° C. under continuous stirring while enclosed under argon gas atmosphere. The resulting solution was further diluted with THF and dropped as SSE material 708 on the catalyst/carbon material 706 to obtain a SSE concentration of 0.3-1 mg/cm$^2$. The resulting composite structure 710 was then dried under vacuum and transferred to low-pressure chemical vapor deposition chamber (LP-CVD) and annealed under vacuum (~300 mTorr) at 550° C. for 1 hour. The resulting cathode including the catalyst and the SSE material (i.e., composite structure 710, shown in magnified view 714) was then loaded with sulfur powder using a hot-pressing technique at 155° C. for 20-30 min. The resulting sulfur-loaded cathode was dropped with a liquid electrolyte 712 (e.g., 1 M LiTFSI in 50/50 vol. % DME/DOL solution) at an E/S (electrolyte to sulfur) ratio of 3 μl/mg and directly used as cathode for fabricating a Li—S battery. The full cell Li—S battery included the cathode including a coating comprising catalyst, SSEs, liquid electrolytes, and sulfur, an anode made of Li-metal foil, and a separator pre-dipped and drained in 1M LiTFSI per liter of a solvent including 50% volume dimethoxyethane and 50% volume dioxolane electrolyte. No extra electrolyte was dropped within the Li—S battery. An areal sulfur loading for the coated cathode of 4 mg/cm$^2$ was achieved by stacking two 3D CNF structures having coatings that include catalyst, SSEs, and liquid electrolytes.

Figure 8:
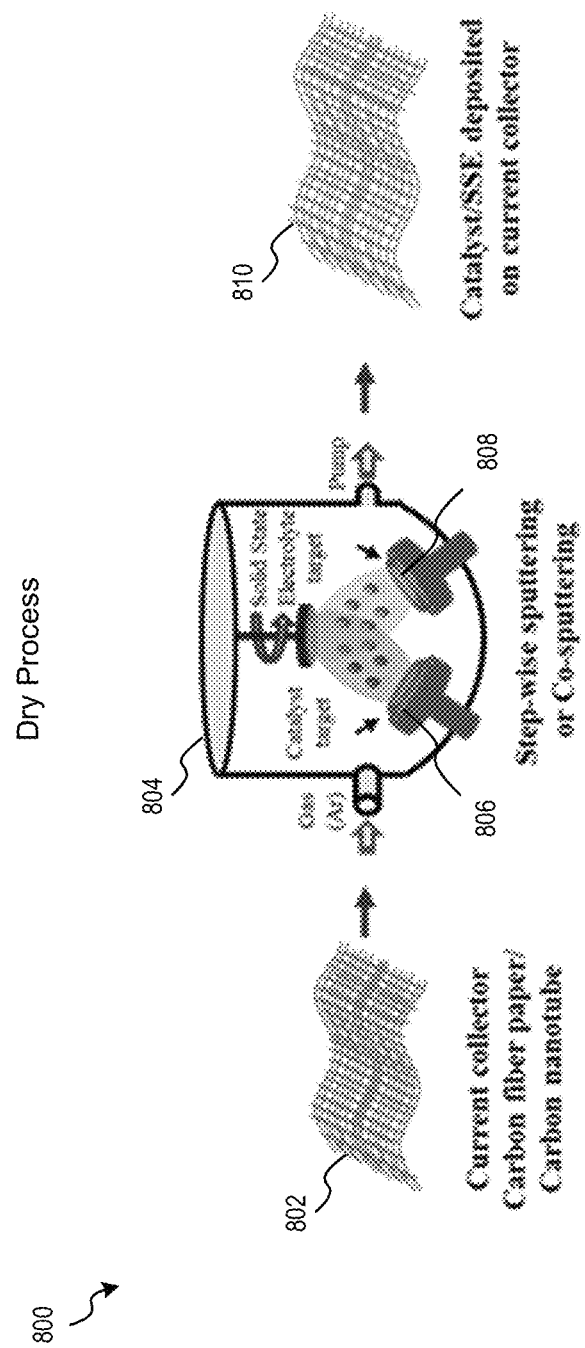
FIG. 8 illustrates a schematic for an example synthesis method (e.g., a dry process) to form the cathode of FIG. 6 according to one or more aspects.

FIG. 8 shows a schematic 800 of a synthesis method for forming a cathode coated with hybrid electrolytes and catalysts. The example in FIG. 8 corresponds to a dry process for forming the cathode. The dry process may include placing a current collector 802 (e.g., CNF paper or CNT material) within a chamber 804 and sputtering the catalyst from catalyst target 806 and the SSE materials from SSE target 808 on the current collector 802 to form catalyst/SSE coated current collector 810. In some implementations, the dry process is similar to the operations described above with reference to FIGS. 3A-D.

Figures 9A, 9B:
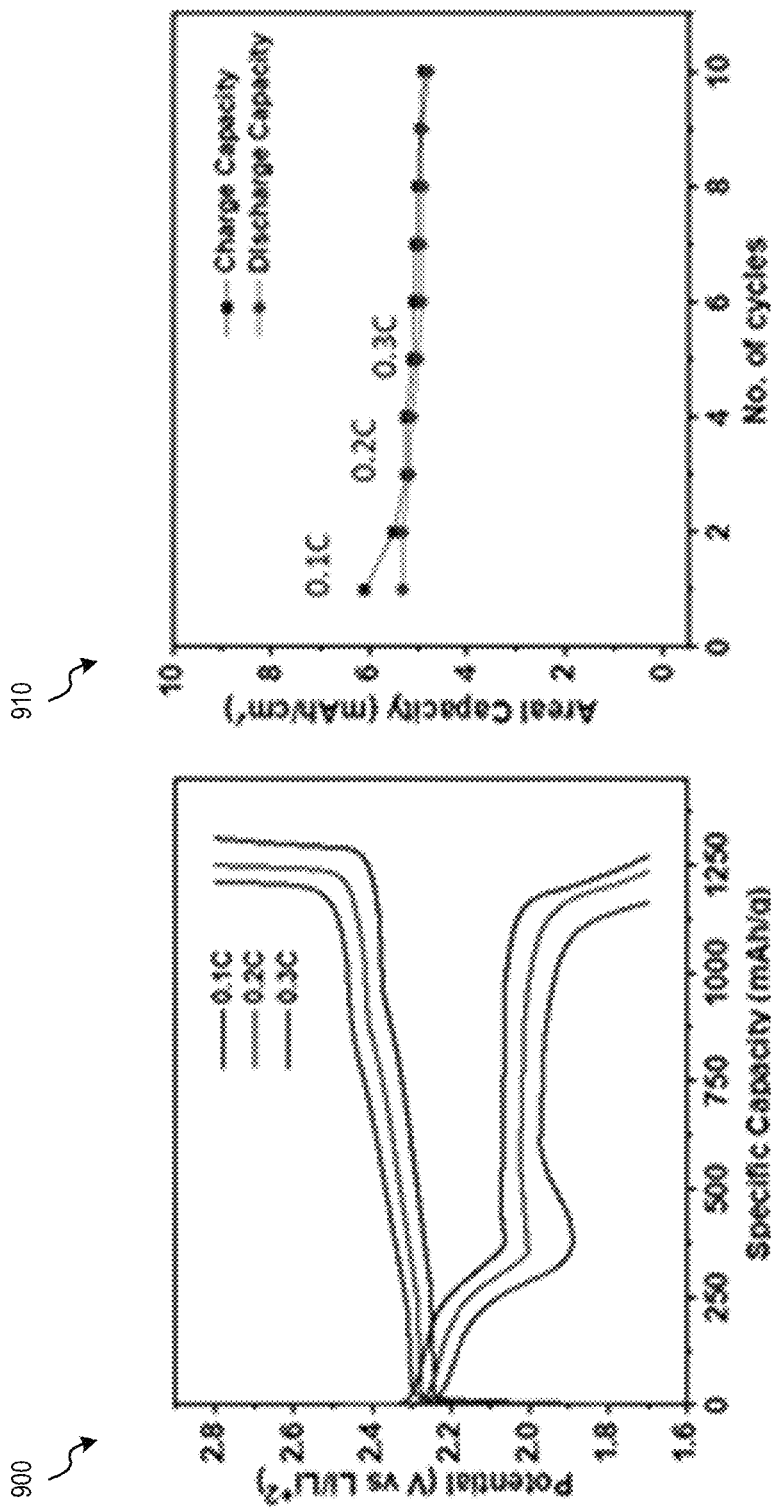
FIGS. 9A-B illustrate test data corresponding to a Li—S battery that includes the cathode of FIG. 6.

FIGS. 9A-B show the representative data for tests of the full cell Li—S battery fabricated using $Mo_{0.5}W_{0.5}S_2$ catalyst, SSEs, and liquid electrolytes for a coating with a sulfur loading of 4 mg/cm$^2$ and an E/S ratio of 3 μL/mg. Specifically, FIG. 9A shows graph 900 of the galvanostatic charge-discharge curves at different C-rates and FIG. 9B shows graph 910 of 10 cycles of stability data consisting of 2 cycles at 0.1 C, 2 cycles at 0.2 C, and 6 cycles at 0.3 C. The full cell Li—S battery fabricated using a cathode with a coating that includes catalyst, SSE, and liquid electrolyte resulted in higher capacity retention of greater than 5 milliamp-hours per cm$^2$ (equivalent energy density of 405 Wh/kg) at the extreme condition of an E/S ratio less than 3.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method comprising:
providing a carbon material;
depositing a catalyst material and a solid state electrolyte material on the carbon material to form a hybrid electrolyte-catalyst coated carbon material; and
depositing a liquid electrolyte material on the hybrid electrolyte-catalyst coated carbon material, wherein the catalyst material, the solid state electrolyte material, and the liquid electrolyte material form one or more coating layers on the carbon material;
wherein depositing the catalyst material and the solid state electrolyte material comprises depositing a mixture of the catalyst material and the solid state electrolyte material on the carbon material.

2. The method of claim 1, wherein depositing the catalyst material and the solid state electrolyte material comprises:
depositing the catalyst material on the carbon material; and
depositing the solid state electrolyte material on the catalyst material and the carbon material.

3. The method of claim 1, further comprising, prior to depositing the liquid electrolyte material, annealing the hybrid electrolyte-catalyst coated carbon material at a temperature between 50 and 1000° C. for a duration that does not exceed 10 hours.

4. The method of claim 1, further comprising hot-pressing, at a temperature between 10° and 200° C., sulfur powder on the hybrid electrolyte-catalyst coated carbon material, wherein a weight of the carbon material is between 1 and 10 milligrams (mg) per square centimeter ($cm^2$) and a weight of the sulfur powder is between 1 and 10 mg/$cm^2$.

5. The method of claim 1, further comprising casting sulfur onto the hybrid electrolyte-catalyst coated carbon material, wherein the sulfur is cast via a sulfur binder solution or a polysulfide solution.

6. The method of claim 1, further comprising sulfurizing the hybrid electrolyte-catalyst coated carbon material, wherein, after the sulfurizing:
a weight percentage of sulfur to a total weight of the sulfur and the hybrid electrolyte-catalyst coated carbon material is between 1 and 99%; and
a ratio of the liquid electrolyte material to the sulfur is between 1 and 20 microliters (μl) per milligram.

7. The method of claim 1, wherein depositing the catalyst material and the solid state electrolyte material on the carbon material comprises:
dropping a solution of the solid state electrolyte material and a solvent onto the catalyst material and the carbon material after dropping the catalyst material on the carbon material; or
dropping a solution of the solid state electrolyte material, the catalyst material, and a solvent onto the carbon material.

8. The method of claim 7, further comprising, prior to dropping the solution, dissolving, in a non-reactive organic solvent, each of a lithium halogenide, a phosphorus pentasulfide, and a lithium sulfide, a catalyst precursor material, or a combination thereof, to form the solution.

9. The method of claim 8, wherein the dissolving occurs at a temperature range between 25 and 100° C. for at least 1 hour.

10. The method of claim 7, further comprising sintering the hybrid electrolyte-catalyst coated carbon material after dropping the solution, wherein the sintering is performed at a temperature between 25 and 1000° C. for between 1 and 10 hours.

11. The method of claim 7, wherein the solution includes a ratio of the solid state electrolyte material to the solvent that is between 0.05 and 100 milligrams per milliliter (mL).

12. The method of claim 7, wherein the solution of the solid state electrolyte material and the solvent includes a ratio of the solution to an area of the carbon material between one microliter (μl) per square centimeter ($cm^2$) and one milliliter (mL) per $cm^2$, and wherein a ratio of a weight of the carbon material to the area of the carbon material is between one milligram (mg) per $cm^2$ and ten mg per $cm^2$.

13. The method of claim 7, further comprising, prior to dropping the solution, dissolving, in the solvent, each of ammonium tetrathiomolybdate and ammonium tetrathiotungstate to form the solution, the solvent including a non-reactive organic solvent.

14. The method of claim 1, wherein depositing the catalyst material and the solid state electrolyte material on the carbon material comprises co-sputtering the catalyst material and the solid state electrolyte material on the carbon material.

15. The method of claim 14, further comprising controlling a deposition power associated with co-sputtering the catalyst material or the solid state electrolyte material, a deposition time associated with the co-sputtering the catalyst material or the solid state electrolyte material, or a combination thereof, to control a composition of the hybrid electrolyte-catalyst coated carbon material.

* * * * *